US012608081B2

(12) United States Patent
Chan et al.

(10) Patent No.: US 12,608,081 B2
(45) Date of Patent: Apr. 21, 2026

(54) GAZE-BASED INTERACTION AND THE METHOD THEREOF

(71) Applicant: CENTRE FOR PERCEPTUAL AND INTERACTIVE INTELLIGENCE (CPII) LIMITED, Pak Shek Kok (HK)

(72) Inventors: Yuen Yan Chan, Pak Shek Kok (HK); Xindi Tong, Pak Shek Kok (HK)

( * ) Notice: Subject to any disclaimer, the term of this patent is extended or adjusted under 35 U.S.C. 154(b) by 0 days.

(21) Appl. No.: 18/983,659

(22) Filed: Dec. 17, 2024

(65) Prior Publication Data

US 2025/0251788 A1 Aug. 7, 2025

Related U.S. Application Data

(60) Provisional application No. 63/549,349, filed on Feb. 2, 2024.

(51) Int. Cl.
*G06F 3/01* (2006.01)

(52) U.S. Cl.
CPC .............. *G06F 3/013* (2013.01); *G06F 3/012* (2013.01)

(58) Field of Classification Search
CPC ................................. G06F 3/013; G06F 3/012
See application file for complete search history.

(56) References Cited

U.S. PATENT DOCUMENTS

| | | | |
|---|---|---|---|
| 5,360,971 A | 11/1994 | Kaufman et al. | |
| 8,793,620 B2 * | 7/2014 | Stafford | .............. G06F 3/04842 |
| | | | 715/858 |
| 10,540,008 B2 * | 1/2020 | Klingström | ............ B60K 35/10 |
| 11,435,822 B2 * | 9/2022 | Yamashita | .............. A61B 5/163 |
| 11,880,501 B2 * | 1/2024 | Connor | ................... G06F 3/017 |
| 12,326,971 B1 * | 6/2025 | Abel | ........................ G06F 3/012 |
| 2016/0077344 A1 * | 3/2016 | Burns | ..................... G06F 3/012 |
| | | | 345/419 |
| 2016/0170482 A1 * | 6/2016 | Yajima | .................... G06F 3/011 |
| | | | 345/8 |
| 2019/0324270 A1 | 10/2019 | Stellmach | |
| 2020/0012341 A1 | 1/2020 | Stellmach et al. | |
| 2020/0081526 A1 * | 3/2020 | Walker | .................... G06F 3/012 |
| 2020/0305707 A1 | 10/2020 | Fink et al. | |
| 2021/0103336 A1 * | 4/2021 | Li | ............................ G06F 3/012 |
| 2022/0129080 A1 * | 4/2022 | Yasuda | .............. G02B 27/0093 |

OTHER PUBLICATIONS

Adriano Galante, Paulo Menezes, "A Gaze-Based Interaction System for People with Cerebral Palsy", Procedia Technology, vol. 5, 2012, pp. 895-902, ISSN 2212-0173, https://doi.org/10.1016/j.protcy. 2012.09.099. (https://www.sciencedirect.com/science/article/pii/ S2212017312005300).

* cited by examiner

*Primary Examiner* — Mihir K Rayan
(74) *Attorney, Agent, or Firm* — Egbert, McDaniel & Swartz, PLLC

(57) ABSTRACT

Disclosed is a system and method for adjusting an eye-gaze of a disabled subject having involuntary head movements. The system includes one or more processors and a database coupled to one or more processors, wherein the database includes an adaptation module. The adaptation module is programmable to execute instructions for tracking and monitoring an eye-gaze and head movements of the subject during a gaze-based interaction, computing the tracked eye-gaze and the head movements of the subject based on pre-determined parameters, and generating an adjusted eye-gaze until the interaction completes.

9 Claims, 1 Drawing Sheet

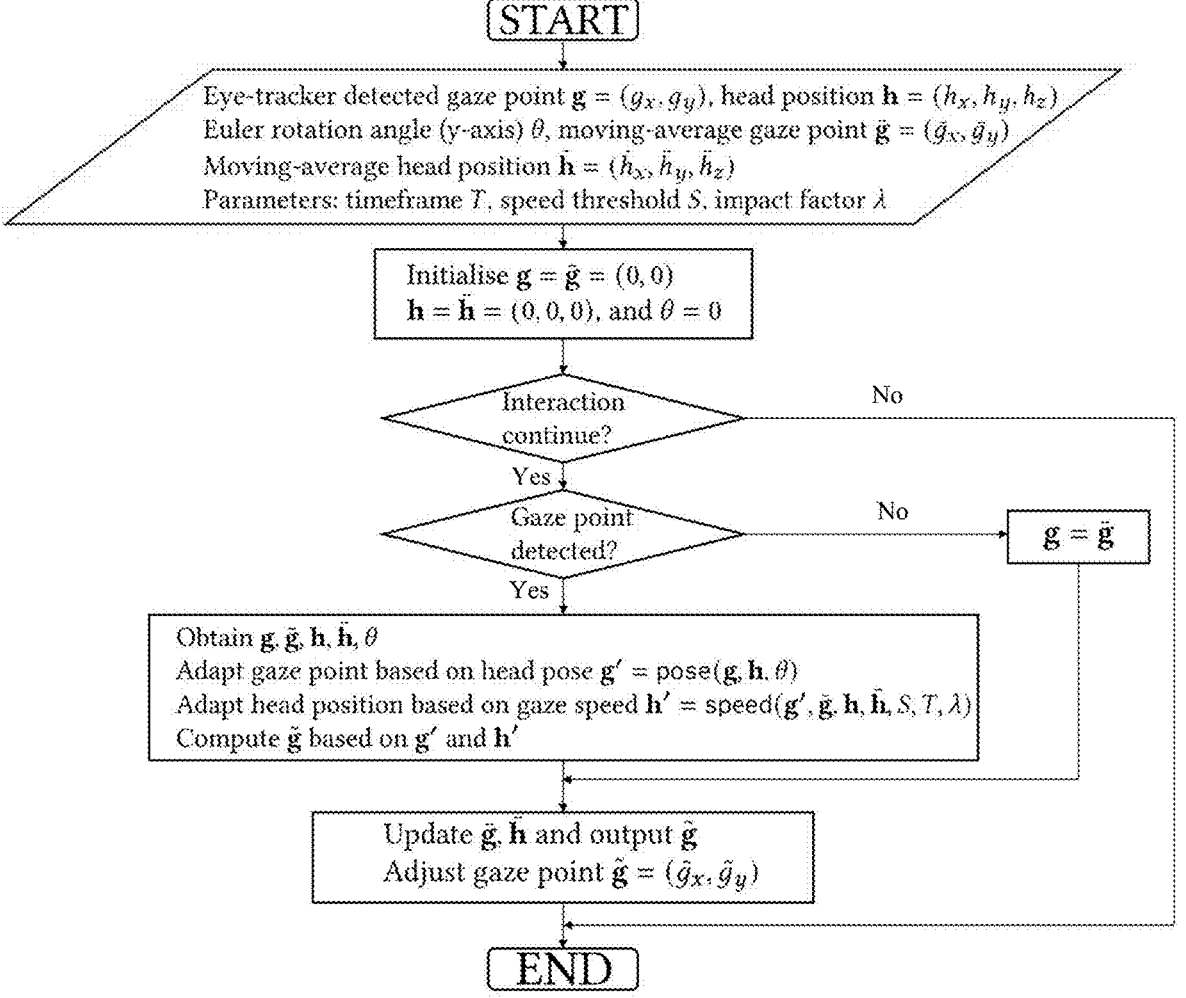

GAZE-BASED INTERACTION AND THE METHOD THEREOF

CROSS-REFERENCE TO RELATED APPLICATIONS

This application claims priority to U.S. Provisional Patent Application No. 63/549,349, filed on Feb. 2, 2024, presently pending.

FIELD OF THE INVENTION

The present invention relates generally to an assistive technology (AT) used in a human-computer visual interaction field. More particularly, the present invention relates to a gaze-based interaction adaptation algorithm for people with involuntary head movements.

BACKGROUND OF THE INVENTION

Gaze estimation is an important element in the computer vision and machine learning sector. Eye-tracking and gaze-based interactions have made Assistive Technology (AT) more accessible to people with physical limitations and disabilities. Most existing eye trackers are based on real time video analyses, where a camera is used to detect the pupil centre and corneal reflection to estimate the user's fixation points. This method requires the stability of the user's head, which is often not the case for people having Athetoid or Dyskinetic cerebral palsy (CP), some of the post-stroke patients, and severe intellectual disabilities (ID). These users often have involuntary abnormal movements with patterns different from natural head movements, which lead them to face difficulties in using eye trackers due to their involuntary body movements, especially head movements. A frequent device re-calibration is needed to ensure the accuracy of the selections when involuntary movements occurred during a visual interaction. Therefore, it is inevitable that some data inaccuracy might have been collected during visual interaction rendering a certain amount of data inaccuracy as well as flaws in the intended communication.

To date, there have been methods and systems introduced in improving the mechanism of the AT. Some of these examples are discussed in the following prior arts.

Galante et. al. (2012), disclosed the development of an augmentative system for people with movement disabilities (mostly people with cerebral palsy) to communicate with the people that surround them, through a human-computer interaction mechanism. The developed application is an assistive technology based on gaze tracking in order to select symbols on communication boards, which represent words or ideas, so that it could easily create phrases for the patient's daily needs. This kind of communication board is already used by people with cerebral palsy, thus it is an extension of their use for people with absolutely no motor coordination. The said invention is another method to adapt a users' body movement with Auxiliary equipment. The prior art disclosed binary position markers which have a binary code to distinguish a particular marker from a set. The markers then assist in computing the homograph of each image received from the camera even when the user moves the head, and a correct mapping between the eye tracker's coordinates and the communication board are always computed. Whilst it is possible to identify the known set of points in each image of the board, the prior art may still lack accuracy in displaying the results especially when there are sudden changes made due to the involuntary head movements of the users.

U.S. Pat. No. 5,360,971 disclosed an eye tracking interface system for generating communication and control functions as a result of pre-defined eye gestures. The prior art used an electrooculography method. The setup of the algorithm comprises a detection apparatus designed to identify bio-electromagnetic signals produced by eye movements. An initial processor processes the identified bio-electromagnetic signals, producing tokens that represent predefined eye gestures. A subsequent processor receives these tokens and generates command signals using a protocol that links tokens to intended command signals. Subsequently, a user interface reacts to these command signals, offering control functionalities in response to the received commands. Furthermore, the prior art may have utilized electrooculography (EOG) to gauge the cornea-retinal standing potential within the human eye. This method is unfavorable for certain groups of users due to its invasiveness and discomfort. EOG measurements can also be affected by external electrical signals, leading to distorted or misleading readings. Shielding against such interference can be challenging and may require controlled environments, making the technique less practical in certain real-world settings.

US20200305707 relates to apparatus, software and methods for assessing ocular, ophthalmic, neurological, physiological, psychological and behavioral conditions. The conditions are assessed using eye-tracking technology that beneficially eliminates the need for a subject to fixate and maintain focus during testing or to produce a secondary (non-optical) physical movement or audible response, i.e., feedback. The subject is only required to look at a series of individual visual stimuli, which is generally an involuntary reaction. The reduced need for cognitive and physical involvement of a subject allows the present modalities to achieve greater accuracy, due to reduced human error, and to be used with a wide variety of subjects, including small children, patients with physical disabilities or injuries, patients with diminished mental capacity, elderly patients, animals, etc. The invention disclosed the Virtual Opportunistic Reaction Perimetry (VORP) test using a head-mounted display in virtual reality (VR), augmented reality (AR), or mixed reality (MR). It starts with initialization by monocular eye or gaze tracking for the tested eye is activated and remains on for the entire test, recording tracking data for each eye. Then, it stimulates the presentation and continues to evaluate the stimulus result and gaze-tracking data related to the subject's response. Within the VR headset's field of view, the participant is instructed to pursue perceived light stimuli that are displayed at pseudo-random locations. That is, places selected by the VORP testing program. Further, the prior art uses a light-emitting device to display a series of individual visual stimuli to a subject, thus tracking and analyzing the data indicative of the tracked eye movement using the embedded algorithms. Besides, the prior art disclosed that the processor of the apparatus executes at least one of the algorithms, including a deterministic algorithm, a non-deterministic algorithm, a stochastic algorithm, a machine learning algorithm, and a deep learning algorithm. Additionally, the prior art algorithm uses single-eye data as input for testing, and upon separate instantiation, gaze tracking for both eyes may be activated only in response to the presentation of a visual stimulus. Due to the possibility that a subject would not move their gaze back to a neutral place after each stimulus event, the adaptation depends on the positions of the following visual stimuli. As such, the VR headset's half screen is off for the eye that is not being tested. This may cause a visual imbalance of the user. The user might perceive a discrepancy between the images seen by each eye, potentially causing discomfort, dizziness, or visual discomfort. Other than that, one of the disadvantages of using a VR headset is that a more complex calibration may be risked. Achieving accurate calibration between the eye tracker and the virtual reality display becomes more complex when only one eye is being tested at a time. Besides, the extended use of headsets can lead to discomfort and fatigue, particularly if they are heavy or if the user is sensitive to prolonged periods of wearing a device on their head, and the VR headsets often require more technical setup and maintenance. A high-quality VR headset can also be expensive, limiting accessibility for some users or organizations.

US20190324270 relates to a method for improving visual interaction with a virtual environment which includes measuring a position of a user's gaze relative to a virtual element, presenting a visual cue when the user's gaze overlaps the virtual element, and guiding the user's gaze towards an origin of the virtual element with the visual cue. The said invention disclosed a user-wearing Head-Mounted Display (HMD), with a waveguide near the user to direct visual information. The HMD may have a single waveguide or multiple waveguides (two or more) for each eye, offering a broader field of view. The HMD may include processors, storage, power supplies, audio and display devices, cameras, and communication tools to receive, process, and present information to the user. A display device adjacent to the waveguide provides visual information, and in some embodiments, a gaze-tracking device within the HMD tracks the user's gaze direction using cameras to image various parts of the eye. The optical communication of HMD between the waveguide, display device, and gaze-tracking device are all in data communication with a processor and a storage device containing instructions for executing the methods described. The prior art also disclosed a method for improving visual interaction with a virtual environment using gaze-based targeting and selection. It is also mentioned that saccadic movement of the eye may produce abrupt movements leading to uncertainty in the gaze location and disclosed the feature of a gaze cloud to include an average of a plurality of measured gaze positions. However, there are more other involuntary movements than saccadic movements. The prior art also focused on the virtual environment, and not to be implemented in the real world. In addition, the prior art did not disclose any algorithm used to reduce the inaccuracy by having the saccadic movements during the operation of the system.

US20200012341 relates to a method for improving user interaction with a virtual environment which includes presenting the virtual environment to a user on a display, measuring a gaze location of a user's gaze relative to the virtual environment, casting an input ray from an input device, measuring an input ray location at a distal point of the input ray, and snapping a presented ray location to the gaze location when the input ray location is within a snap threshold distance of the input ray location. The prior art disclosed a user-wearing Head-Mounted Display (HMD) that may include a housing containing various components such as processors, storage devices, cameras, and more. The HMD may incorporate a near-eye display positioned near the user, providing visual information to the user's field of view. The HMD may also feature one or more cameras for imaging the user's physical environment, aiding in image recognition and depth sensing. Furthermore, a gaze-tracking device within the HMD is positioned to track the user's gaze direction, measure eye movements and, in some cases, hand gestures with a near-eye display, camera, and gaze-tracking device in communication with a processor. The processor is also connected to a storage device containing instructions for executing disclosed methods. An input device may provide user inputs, such as cursor positioning, and the HMD may involve augmented or mixed reality features, presenting visual information overlaying the user's surroundings. However, the invention disclosed a way of improving interaction with virtual elements using gaze-based guidance of a targeting ray used for selection and manipulation. It also focused on the use of a head-mounted display that presents visual information to a user overlaid on the user's view of their surroundings. As mentioned above, the use of HMD may risk a more complex calibration. Besides, the extended use of HMD can lead to discomfort and fatigue, particularly if they are heavy or if the user is sensitive to prolonged periods of wearing a device on their head, and the headsets often require more technical setup and maintenance. A high-quality headset can also be expensive, limiting accessibility for some users or organizations.

The references described above, and other existing systems are used in visual interaction, albeit some of them did not address usage by specifically a person with involuntary movements. Further, the systems and methods potentially face difficulties in maintaining a smooth interaction experience even when the user's head is not in the optimal position for the eye-tracker. Moreover, they do not provide a solution to assist in stabilizing the gaze trace on the user interface so as to facilitate other gaze-based interactions.

Therefore, there still remains a need in the field to provide a solution that solves the problems described herein.

SUMMARY OF THE INVENTION

The following presents an eye-tracking adaptation algorithm and the method thereof pertaining to the head movement prediction and fixation smoothing in order to stabilize the target users' gaze points on the screen and improve their user experience (UX) in a gaze-based interaction.

It is an objective of the present invention to increase the accuracy of users' selection when the user is having involuntary head movements during a visual interaction.

It is also an objective of the present invention to provide a shorter selection time for users when the user is having involuntary head movements during a visual interaction.

Accordingly, these objectives may be achieved by following the teachings of the present invention. The present invention discloses a method for adjusting an eye-gaze of a disabled subject having involuntary head movements comprising: detecting an initial gaze point (g) and head movements including head position (h) and rotation angle ($\theta$) during gaze-based interactions; monitoring for continuous interactions by continuously detecting the gaze point (g), the head position (h) and the rotation angle ($\theta$); computing the detected and monitored eye-gaze and the head movements of the subject based on pre-determined parameters during the interactions; and, generating an adjusted eye-gaze ($\tilde{g}$) until the interaction is completed.

Additionally, these objectives may also be achieved by the following teachings of the present invention. The present invention provides a system for adjusting an eye-gaze of a disabled subject having involuntary head movements, comprising: an adaptation module; a processor in data communication with the adaptation module; and, a hardware storage medium in data communication with the processor, the hardware storage medium having instructions thereon that, when executed by the processor, cause the processor to: detect and monitor an initial eye-gaze point (g) and head movements including head position (h) and rotation angle (θ) during gaze-based interactions; and, compute and generate an adjusted eye-gaze (g̃) based on the eye-gaze and the head movements of the subject based on pre-determined parameters until the interactions are completed.

BRIEF DESCRIPTION OF DRAWINGS

The features of the invention will be more readily understood and appreciated from the following detailed description when read in conjunction with the accompanying drawing of the preferred embodiment of the present invention, in which:

FIG. 1 is a process flow diagram illustrating an adaptation algorithm and a method in a gazed based interaction in accordance with an embodiment of the present invention.

DETAILED DESCRIPTION OF THE INVENTION

For the purposes of promoting and understanding the principles of the invention, reference will now be made to the embodiments illustrated in the drawings and described in the following written specification. It is understood that the present invention includes any alterations and modifications to the illustrated embodiments and includes further applications of the principles of the invention as would normally occur to one skilled in the art to which the invention pertains.

The present invention provides a method for adjusting an eye-gaze of a disabled subject having involuntary head movements comprising: detecting an initial gaze point (g) and head movements including head position (h) and rotation angle (θ) during gaze-based interactions; monitoring for continuous interactions by continuously detecting the gaze point (g), the head position (h) and the rotation angle (θ); computing the detected and monitored eye-gaze and the head movements of the subject based on pre-determined parameters during the interactions; and, generating an adjusted eye-gaze (g̃) until the interaction is completed.

In accordance with an embodiment of the present invention, the step of monitoring for the continuous interactions by continuously detecting the gaze point (g), the head position (h) and the rotation angle (θ); further comprising: generating moving-average gaze point (g̅) and moving-average head position (h̅) values based on the gaze point (g) and head position (h) values.

In accordance with an embodiment of the present invention, the step of computing the detected and monitored eye-gaze and the head movements of the subject based on the pre-determined parameters, further comprising: obtaining the gaze point (g), head position (h), moving-average gaze point (g̅), moving-average head position (h̅) and rotation angle (θ) value if continuous interaction is detected; adapting the gaze point (g) based on the head position and the rotation angle to produce an adapted gaze point (g'); adapting the head position (h) based on a gaze speed (v) to produce an adapted head position (h'); computing and generating the adjusted eye-gaze (g̃) based on the adapted gaze point (g') and the adapted head position (h'); and, updating the moving-average gaze point (g̅) until the interaction completes.

In accordance with an embodiment of the present invention, the method further comprising: denoting the gaze point (g) as equal to a moving-average gaze point (g̅) when the interactions continue but no further gaze point (g) is detected; updating the moving-average gaze point (g̅); and, computing and generating the adjusted eye-gaze (g̃) until the interaction is completed.

In accordance with an embodiment of the present invention, the method further comprising: stopping the computation and generation of the adjusted eye-gaze (g̃) when no further interactions are detected, and the interactions are deemed completed.

In accordance with an embodiment of the present invention, the step of adapting the head position (h) based on the gaze speed (v) to produce the adapted head position (h') further comprising: calculating the gaze speed (v) based on the gaze point (g) and the moving-average gaze point (g̅) with a pre-determined timeframe (T); determining an impact factor (λ) that decides a confidence level of current measurement based on a pre-determined speed threshold (S); and, outputting a 3D vector, representing the adapted head position (h').

In accordance with an embodiment of the present invention, the present invention further comprising the step of initiating the adaptation module before commencing the gaze-based interactions wherein the tracked gaze point (g), the head position (h), the rotation angle (θ), a moving-average gaze point (g̅) and moving-average head position (h̅) values are set to an initial value of 0.

The present invention also provides a system for adjusting an eye-gaze of a disabled subject having involuntary head movements, comprising: an adaptation module; a processor in data communication with the adaptation module; and, a hardware storage medium in data communication with the processor, the hardware storage medium having instructions thereon that, when executed by the processor, cause the processor to: detect and monitor an initial eye-gaze point (g) and head movements including head position (h) and rotation angle (θ) during gaze-based interactions; and, compute and generate an adjusted eye-gaze (g̃) based on the eye-gaze and the head movements of the subject based on pre-determined parameters until the interactions are completed.

In accordance with an embodiment of the present invention, the adaptation module computes an adjusted eye-gaze (g̃) based on the adapted gaze point (g') and the adapted head position (h').

In accordance with an embodiment of the present invention, the rotation angle (θ) is a y-axis Euler rotation angle (θ).

In accordance with an embodiment of the present invention, the eye-gaze point (g) is in 2D, and the tracked head position (h) is in 3D.

More specifically, the present invention provides an adaptation algorithm and a method in gaze-based interaction for people with involuntary head movements. The present invention is a screen-based project that is positioned at the bottom of the screen rather than on top of the head and uses data from both eyes and adapts to the user's head position and movement speed using a trained model.

The present invention comprises a Head Pose Monitor, and Gaze Points Speed Controller. More specifically, the present invention employs non-collimated infrared and near-infrared light, along with the pupil's centre, to generate corneal reflections (CR). The calculation of the point of regard on a surface or gaze direction is achieved by determining the vector connecting the pupil centre and corneal reflections.

The Head Pose Monitor, g, h, θ, produces an adapted gaze point, g', based on the 2-dimensional detected gaze point, g, the 3-dimensional detected head position, h, and the y-axis Euler rotation angle of the user's head, θ. The Head Pose Monitor, g, h, θ, aims to overcome any gaze point instability due to the user's involuntary head movement. This is particularly important for gaze-based UX, especially when the selection target is small or located at the screen corners.

In accordance with an embodiment of the present invention, the Gaze Points Speed Controller, g, $\bar{g}$, h, $\bar{h}$, λ, is to oppose any sudden changes in head position caused by involuntary head movements.

In accordance with an embodiment of the present invention, the steps of adapting the algorithm comprises defining input and output data, setting up and defining the parameters of the input and output data, declaring and initialising the gaze point, the head position and the y-axis rotation angle, θ, with an initial value of 0, checking if the gaze point is detected during the user interaction, obtaining the data if the gaze point is detected, adapting the gaze point based on the head pose, adapting the head position based on the gaze speed, v, computing the adjusted gaze point, $\tilde{g}$, based on the adapted gaze point, g', and a 3-dimensional vector, h', and updating the data of the moving-average gaze point, $\bar{g}$, and moving-average head position, $\bar{h}$. This process is illustrated in FIG. 1.

The input data includes an eye-tracker detected gaze point, g, head position, h, Euler rotation angle (y-axis), θ, moving-average gaze point, $\bar{g}$, moving-average head position, $\bar{h}$, time frame, T, speed threshold, S, and an impact factor, λ, while the outputs data includes an adjusted gaze point, $\tilde{g}$.

In accordance with an embodiment of the present invention, the coordinates of inputs and outputs data are defined as detected gaze point, $g=(g_x, g_y)$, moving-average gaze point, $\bar{g}=(\bar{g}_x, \bar{g}_y)$, detected head position, $h=(h_x, h_y, h_z)$, moving-average head position, $\bar{h}=(\bar{h}_x, \bar{h}_y, \bar{h}_z)$ and y-axis rotation angle, θ, and adjusted gaze point $\tilde{g}=(\tilde{g}_x, \tilde{g}_y)$.

Further, in accordance with an embodiment of the present invention, the data will be initialised before the commencement of the user interaction process. The initialisation may be represented as:

$$g=\bar{g}=(0,0), h=\bar{h}=(0,0,0), \text{ and } \theta=0$$

Once the data is initialized and the user interaction process begins, the adaptation algorithm will check whether the gaze point is detected during the user interaction. If there is no gaze point detected, the adjusted gaze point, $\tilde{g}$ will be denoted as equal to the moving-average gaze point, $\bar{g}$.

If there is a gaze point detected during the user interaction process, the adaptation algorithm will obtain the data of the detected gaze point, g, the moving-average gaze point, $\bar{g}$, the detected head position, h, the moving-average head position, $\bar{h}$, and the y-axis rotation angle, θ. Then, the gaze point will be adapted based on head pose and produce an adapted gaze point, g'. Meanwhile, the head position will be adapted based on the gaze speed, v, and produce a 3-dimensional vector, h'.

Further, the adaptation algorithm will compute the adjusted gaze point, $\tilde{g}$, based on the adapted gaze point, g', and the 3-dimensional vector, h'.

Further, the adaptation module will then update the data of the moving-average gaze point, $\bar{g}$, and moving-average head position, $\bar{h}$, until the user interaction process is completed.

In accordance with an embodiment of the present invention, the gaze speed, v, is derived from the current gaze point, g, and its most current gaze point, $\bar{g}$, $$v = \frac{\|g - \bar{g}\|}{t_{frame}}$$

with the frame update time, $t_{frame}$, calculating an impact factor, λ.

The impact factor, λ, will decide the confidence level of the current measurement and outputs a 3-dimensional vector, h', as the adapted head position using a sigmoid function where:

$$h' = \lambda h + (1 - \lambda)\bar{h}$$

$$\text{where } \lambda = 1 - 2/\left(1 + e^{v/threshold}\right)$$

Hereinafter, an example of the present invention will be provided for a more detailed explanation. The advantages of the present invention may be more readily understood and put into practical effect from these examples. However, it is to be understood that the following example is not intended to limit the scope of the present invention in any way.

Example

A human-computer interaction experiment has been carried out to evaluate the performance of the present invention. The participants were two patients (1 female, 1 male) with hypertension and cervical muscle strain respectively, having involuntary body movement, including heads and limbs. Written consent from both participants has been obtained prior to the commencement of the study.

A gaze-based interaction game using Unity and Tobii 5's SDK is developed, and the participants were asked to perform the 1-out-of-8 gaze-based icon selection using the Tobii Eye Tracker 5. Each trial comprises 100 selection tasks and each participant has to perform two trials, which are, one as an experimental condition (with the adaptation) and one as a control condition (without the adaptation).

The participants' performance was then measured by participant's icon selection time and selection accuracy. The data from both conditions was collected for statistical analyses. The descriptive statistics of the performance metrics are provided in Table 1 below.

TABLE 1

| Descriptive statistics of user experiment (N = 400). | | |
|---|---|---|
| | Selection Time (s) Mean (SD) | Selection Accuracy (%) Mean (SD) |
| Experimental | 4.79 (1.52) | 92 (27.2) |
| Control | 7.72 (4.32) | 51 (51.1) |

Analysis of variance (ANOVA) shows statistically significant differences across conditions in both selection time ($p<0.001$, $F (1, 398)=82.39$) and selection accuracy ($p<0.001$, $F(1, 398)=103.41$). Furthermore, the effect size is between small to medium for both selection time ($\eta^2=0.17$) and selection accuracy ($\eta^2=0.21$).

The results above indicate that the present invention is able to assist in enhancing the performance of a gazed-based interaction. Specifically, the decrease in selection time and increase in selection accuracy were both statistically significant with a small to medium effect size.

The present invention also continuously records the gaze location of the eye during the eye test to provide a comprehensive and precise dataset of the user's gaze location over time. This ensures that a higher accuracy in the data collection is achieved. The continuous gaze recording also allows for real-time feedback, enabling immediate insights into the user's visual attention. This can be particularly useful in applications where timely responses or adjustments are required based on the user's gaze behavior. Overall, the present invention proposes a novel adaptation algorithm to improve the UX during gaze-based interaction with limitations.

Various adaptations to these embodiments are apparent to those skilled in the art from the description. The principles associated with the various embodiments described herein may be applied to other embodiments. Therefore, the description is not intended to be limited to the embodiments described but is to provide broadest scope of consistent with the principles and the novel and inventive features disclosed or suggested herein. Accordingly, the invention is anticipated to hold on to all other such alternatives, modifications, and variations that fall within the scope of the present invention.

The invention claimed is:

1. A method for adjusting an eye-gaze of a disabled subject having involuntary head movements, the method comprising:

detecting an initial gaze point and a head movement, the head movement having a head position and a rotation angle during a gaze-based interaction;

monitoring for continuous interactions by continuously detecting the gaze point and the head position and the rotation angle so as to generate a moving average gaze point and a moving average head position value based on values of the gaze point and the head position;

computing the detected and monitored eye-gaze and head movements of the subject based on pre-determined parameters during the interactions, the step of computing comprising:

obtaining the gaze point and the head position and the moving average gaze point and the moving average head position and the rotation angle if continuous interaction is detected;

adapting the gaze point based on the head position and the rotation angle so as to produce an adapted gaze point;

calculating the gaze speed based on the gaze point and the moving average gaze point with a pre-determined timeframe;

determining an impact factor that decides a confidence level of current measurement based on a pre-determined speed threshold;

adapting the head position based on the gaze speed and the impact factor so as to produce the adapted head position;

computing and generating the adjusted eye-gaze based on the adapted gaze point and the adapted head position; and updating the moving-average gaze point and moving average head position until the gaze-based interaction is completed; and generating an adjusted eye-gaze until the gaze-based interaction is completed.

2. The method of claim 1, further comprising:

denoting the gaze point as equal to the moving average gaze point when the gaze-based interactions continue but no further gaze point is detected;

updating the moving average gaze point; and computing and generating the adjusted eye-gaze until the gaze-based interactions are completed.

3. The method of claim 2, further comprising:

stopping the step of computing and generating of the adjusted eye-gaze when no further eye-gaze interactions are detected.

4. The method of claim 1, further comprising:

outputting a three-dimensional vector that represents the adapted head position.

5. The method of claim 1, further comprising:

initiating an adaptation module before commencing the gaze-based interactions, wherein the gaze point and the head position and the rotation angle and the moving average gaze point and the moving average head position are set an initial value of zero.

6. A system for adjusting an eye-gaze of a disabled subject having involuntary head movements, the system comprising:

an adaptation module comprising:

a head pose monitor operable to receive a detected gaze point and detected head position and a detected rotation angle and to produce an adapted gaze point by adapting the gaze point based on the head position and the rotation angle;

a gaze points speed controller operable to calculate a gaze speed based on the gaze point and a moving average gaze point and to determine an impact factor and to output an adapted head position; and a computation module operable to compute an adjusted eye gaze based on the adapted gaze point and the adapted head position;

a processor in data communication with said adaptation module; and a hardware storage medium in data communication with said processor, wherein the hardware storage medium having instructions thereon that, when executed by said processor, causes said processor to detect and monitor an initial eye-gaze point and head movements, the head movements including head position and a rotation angle during gaze-based interactions, and to compute a moving average head position value, and to execute said head pose monitor to produce the adapted gaze point, to execute said gaze points speed controller to produce the adapted head position, and to compute and generate and adjusted eye-gaze based on the adapted gaze point and the adapted head position based on the eye-gaze and the head movement of the subject based on pre-determined parameters until the interactions are completed.

7. The system of claim 6, wherein said adaptation module computes an adjusted eye-gaze based on the adapted gaze point and the adapted head position.

8. The system of claim 6, wherein the rotation angle is a y-axis Euler rotation angle.

9. The system of claim 6, wherein the eye-gaze point is in two dimensions, the head position being in three dimensions.

* * * * *